United States Patent
Tang et al.

(10) Patent No.: US 9,633,227 B2
(45) Date of Patent: Apr. 25, 2017

(54) METHOD, APPARATUS, AND SYSTEM OF DETECTING UNAUTHORIZED DATA MODIFICATION

(71) Applicant: TENCENT TECHNOLOGY (SHENZHEN) COMPANY LIMITED, Shenzhen (CN)

(72) Inventors: Wen Tang, Shenzhen (CN); Xuxin Wang, Shenzhen (CN); Jianhui Yao, Shenzhen (CN); Le Liu, Shenzhen (CN); Cheng Cai, Shenzhen (CN); Jin Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 215 days.

(21) Appl. No.: 14/451,170

(22) Filed: Aug. 4, 2014

(65) Prior Publication Data
US 2015/0033334 A1    Jan. 29, 2015

Related U.S. Application Data

(63) Continuation of application No. PCT/CN2014/078469, filed on May 27, 2014.

(30) Foreign Application Priority Data

Jul. 29, 2013 (CN) .......................... 2013 1 0323073

(51) Int. Cl.
*G06F 21/64* (2013.01)
*G06F 21/62* (2013.01)

(52) U.S. Cl.
CPC .......... *G06F 21/64* (2013.01); *G06F 21/6209* (2013.01); *G06F 2221/2101* (2013.01); *G06F 2221/2109* (2013.01)

(58) Field of Classification Search
None
See application file for complete search history.

(56) References Cited

U.S. PATENT DOCUMENTS

| 7,134,144 | B2 | 11/2006 | McKune |
| 7,558,966 | B2 * | 7/2009 | Durham ............... G06F 11/2294 713/187 |

(Continued)

FOREIGN PATENT DOCUMENTS

| CN | 1851659 A | 10/2006 |
| CN | 1905448 A | 1/2007 |

(Continued)

OTHER PUBLICATIONS

The World Intellectual Property Organization (WIPO) International Search Report for PCT/CN2014/078469 Sep. 1, 2014.

(Continued)

*Primary Examiner* — Farid Homayounmehr
*Assistant Examiner* — Henry Tsang
(74) *Attorney, Agent, or Firm* — Anova Law Group, PLLC

(57) ABSTRACT

Methods, apparatus and system of detecting data security are provided herein. Data for detection are acquired. Whether the data for detection are to be updated for a first time is determined. When the data for detection are to be updated for the first time, the data for detection can be updated, encrypted, and stored as first encrypted data. When the data for detection are not to be updated for the first time, the data for detection can be acquired and encrypted to provide second encrypted data. The second encrypted data are compared with the stored first encrypted data to determine whether the second encrypted data having been unauthorizedly modified. The present disclosure is simple to be implemented without relying on specific logical of a certain application. Development costs, maintenance costs and (Continued)

occupancy of server resources can be reduced. System performance and user experience can be improved.

18 Claims, 5 Drawing Sheets

(56) References Cited

U.S. PATENT DOCUMENTS

| | | | | |
|---|---|---|---|---|
| 7,685,425 | B1* | 3/2010 | Wright | G06F 21/6218 |
| | | | | 713/176 |
| 8,819,827 | B1* | 8/2014 | Easttom | G06F 21/565 |
| | | | | 713/150 |
| 9,177,153 | B1* | 11/2015 | Perrig | G06F 21/57 |
| 2007/0283194 | A1* | 12/2007 | Villella | G06F 11/3476 |
| | | | | 714/57 |
| 2008/0222368 | A1* | 9/2008 | Gehrmann | G06F 21/572 |
| | | | | 711/152 |
| 2009/0193521 | A1* | 7/2009 | Matsushima | G06F 21/57 |
| | | | | 726/22 |
| 2014/0007069 | A1* | 1/2014 | Cavalaris | G06F 8/665 |
| | | | | 717/170 |

FOREIGN PATENT DOCUMENTS

| | | |
|---|---|---|
| CN | 101021883 A | 8/2007 |
| CN | 101231622 A | 7/2008 |
| CN | 101441696 A | 5/2009 |
| CN | 101483863 A | 7/2009 |
| CN | 102404331 A | 4/2012 |

OTHER PUBLICATIONS

The State Intellectual Property Office of the People's Republic of China (SIPO) Office Action 1 for 201310323073.X Feb. 17, 2015.

* cited by examiner

METHOD, APPARATUS, AND SYSTEM OF DETECTING UNAUTHORIZED DATA MODIFICATION

CROSS-REFERENCES TO RELATED APPLICATIONS

This application is a continuation application of PCT Patent Application No. PCT/CN2014/078469, filed on May 27, 2014, which claims priority to Chinese Patent Application No. 201310323073.X, filed on Jul. 29, 2013, the entire contents of which are incorporated herein by reference.

FIELD OF THE DISCLOSURE

The present disclosure relates to the field of communication technology and, more particularly, relates to methods, apparatus, and systems of detecting data security.

BACKGROUND

With the development of communication technology, data security is getting more and more attention from people. In an example of online games, for certain purposes, some players may cheat, usually by plug-ins. This type of plug-in technology needs to use memory modification tools to modify the key data of the games on a client terminal. This is not only a undermining of fair play, but also a threatening to data security. Anti-plug-in strategies are thus currently developed. Generally, a set of anti-plug-in logic closely related to game logic needs to be developed independently for varies games. Such set of anti-plug-in logic may be installed on a server for the server to operate and verify the data to prevent players from cheating in the game.

However, current strategies are developed for each individual game. The logic used is complicated and cannot be generalized to different games. In addition, a large amount of server resources are used, when the server operates and verifies the data for prevent cheating in the game.

BRIEF SUMMARY OF THE DISCLOSURE

According to various embodiments, there is provided a method of detecting data security. Data for detection are acquired. The data for detection include data that need a security detection and that need to be updated. Whether the data for detection are to be updated for a first time is then determined. When the data for detection are to be updated for the first time is determined, the data for detection can be updated to obtain the updated data for detection, which can then be encrypted to provide first encrypted data. The first encrypted data can be stored. When the data for detection are not to be updated for the first time is determined, an original value of the data for detection can be acquired and encrypted to provide second encrypted data. The stored first encrypted data can be acquired. When the second encrypted data do not equal to the first encrypted data is determined, the data for detection have been unauthorizedly modified can be determined.

According to various embodiments, there is provided an apparatus of detecting data security. The apparatus of detecting data security includes an acquiring unit, a determining unit, a first processing unit, and a second processing unit.

The acquiring unit is configured to acquire data for detection. The data for detection include data that need a security detection and that need to be updated. The determining unit is configured to determine whether the data for detection are to be updated for a first time. The first processing unit is configured, after determining that the data for detection are to be updated for the first time, to update the data for detection, to obtain the updated data for detection, to encrypt the updated data for detection to provide first encrypted data, and to save the first encrypted data. The second processing unit is configured, after determining that the data for detection are not to be updated for the first time, to acquire an original value of the data for detection, to encrypt the original value to provide second encrypted data, to acquire the stored first encrypted data, and to determine that the data for detection have been unauthorizedly modified, after determining that the second encrypted data do not equal to the first encrypted data.

The acquiring unit is further configured to acquire data that need to be updated, and determine that the data that need to be updated are the data for detection. The acquiring unit is further configured to acquire data that need to be updated, and, after determining that the data that need to be updated are key data, determine that the data that need to be updated are the data for detection.

The apparatus of detecting data security further includes a receiving unit and a determining unit. The receiving unit is configured to receive address configuration information of data that need to be monitored sent from a server. The determining unit is configured to determine whether the security detection is needed for the data, according to the address configuration information of the data. The acquiring unit is configured, after determining that the security detection is needed for the data, to acquire the data as the data for detection.

The second processing unit is further configured to send a notification message to the server after determining that the data for detection have been unauthorizedly modified. The notification message indicates that the data have been unauthorizedly modified.

Optionally, the second processing unit is further configured to store the second encrypted data, when that the second encrypted data do not equal to the first encrypted data is determined.

According to various embodiments, there is provided a a non-transitory computer-readable medium having computer program. When being executed by a processor, the computer program performs a method of detecting data security. Data for detection are acquired. The data for detection include data that need a security detection and that need to be updated. Whether the data for detection are to be updated for a first time is then determined. When the data for detection are to be updated for the first time is determined, the data for detection can be updated to obtain the updated data for detection, which can then be encrypted to provide first encrypted data. The first encrypted data can be stored. When the data for detection are not to be updated for the first time is determined, an original value of the data for detection can be acquired and encrypted to provide second encrypted data. The stored first encrypted data can be acquired. When the second encrypted data do not equal to the first encrypted data is determined, the data for detection have been unauthorizedly modified can be determined.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

FIGS. 1-5 depict exemplary methods and apparatus of detecting data security in accordance with various disclosed embodiments. The exemplary methods and apparatus can be implemented, for example, in an exemplary environment 600 as shown in FIG. 6.

Figure 6:
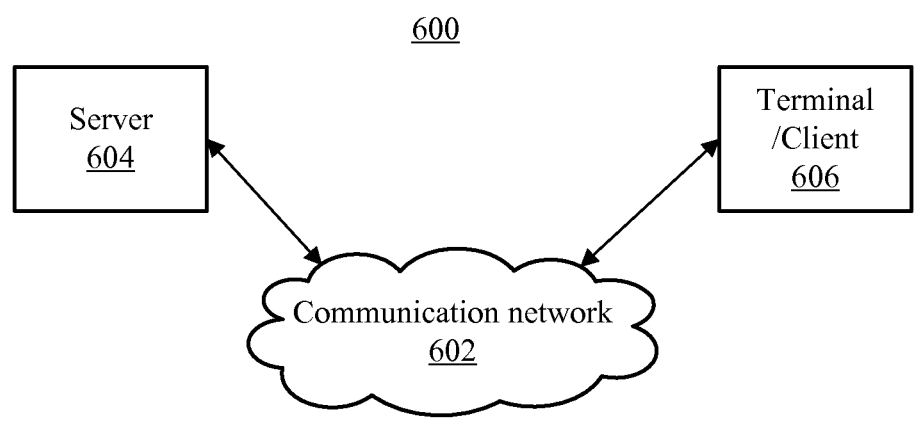
FIG. 6 depicts an exemplary environment incorporating certain disclosed embodiments.

As shown in FIG. 6, the environment 600 can include a server 604, a terminal 606, and a communication network 602. The server 604 and the terminal 606 may be coupled through the communication network 602 for information exchange, for example, Internet searching, webpage browsing, etc. Although only one terminal 606 and one server 604 are shown in the environment 600, any number of terminals 606 or servers 604 may be included, and other devices may also be included.

The communication network 602 may include any appropriate type of communication network for providing network connections to the server 604 and terminal 606 or among multiple servers 604 or terminals 606. For example, the communication network 602 may include the Internet or other types of computer networks or telecommunication networks, either wired or wireless.

A terminal, as used herein, may refer to any appropriate user terminal device with certain computing capabilities, for example, a personal computer (PC), a work station computer, a notebook computer, a car computer (e.g., carrying in a car or other vehicles), a server computer, a hand-held computing device (e.g., a tablet computer), a mobile terminal (e.g., a mobile phone, a smart phone, an iPad, and/or an aPad), a POS (i.e., point of sale) device, or any other user-side computing device. In various embodiments, the terms "terminal" and "terminal device" can be used interchangeably.

Figure 5:
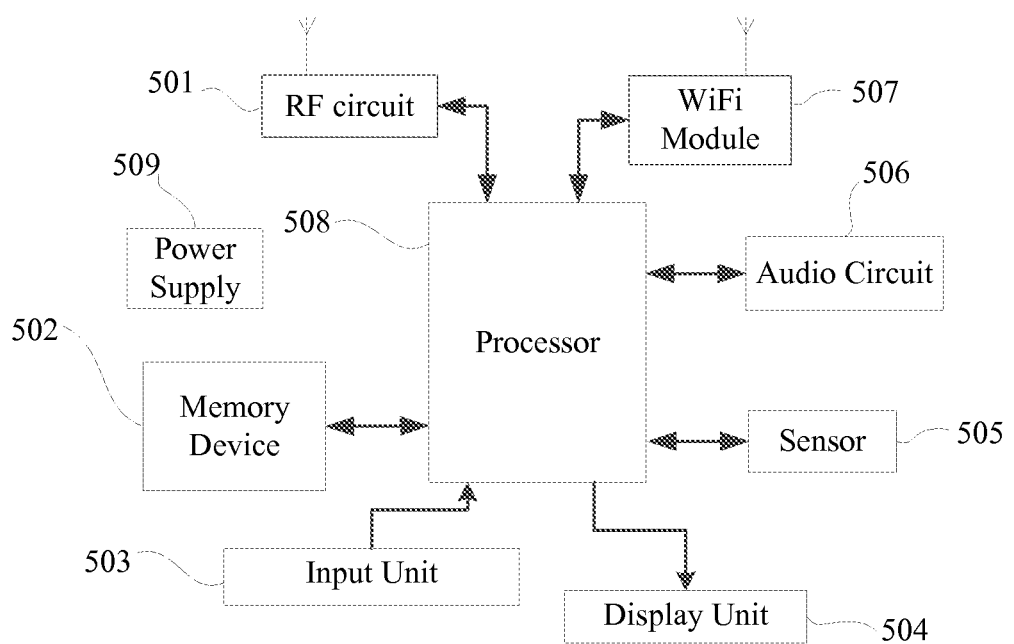
FIG. 5 depicts an exemplary terminal device consistent with various disclosed embodiments.

A server, as used herein, may refer one or more server computers configured to provide certain server functionalities, for example, search engines and database management. A server may also include one or more processors to execute computer programs in parallel. The server 604 and the terminal 606 may be implemented on any appropriate computing platform, e.g., as shown in FIG. 5.

In operation, the terminal 606 may cause the server 604 to perform certain actions, for example, an Internet search or other database operations. The server 604 may be configured to provide structures and functions for such actions and operations. More particularly, the server 604 may include a data searching system for real-time database searching. In various embodiments, a terminal, for example, a mobile terminal involved in the disclosed methods and systems can include the terminal 606.

Methods, apparatus, and systems of detecting data security are provided. Exemplary apparatus of detecting data security can be integrated in a client. The client can be installed in a terminal device. The terminal device can include, but is not limited to, smart phones, tablet computers, e-book readers, moving picture experts group audio layer III (MP3) players, moving picture experts group audio layer IV (MP4) players, laptops, and/or desktop computers. The terminal device can be any device as depicted in FIG. 6.

In an exemplary method of detecting data security, data for detection are acquired. The data for detection include data that need a security detection and that need to be updated. Whether the data for detection are to be updated for a first time is then determined. When the data for detection are to be updated for the first time is determined, the data for detection can be updated to obtain the updated data for detection, which can then be encrypted to provide first encrypted data. The first encrypted data can be stored. When the data for detection are not to be updated for the first time is determined, an original value of the data for detection can be acquired and encrypted to provide second encrypted data. The stored first encrypted data can be acquired. When the second encrypted data do not equal to the first encrypted data is determined, the data for detection have been unauthorizedly modified can be determined.

Figure 1:
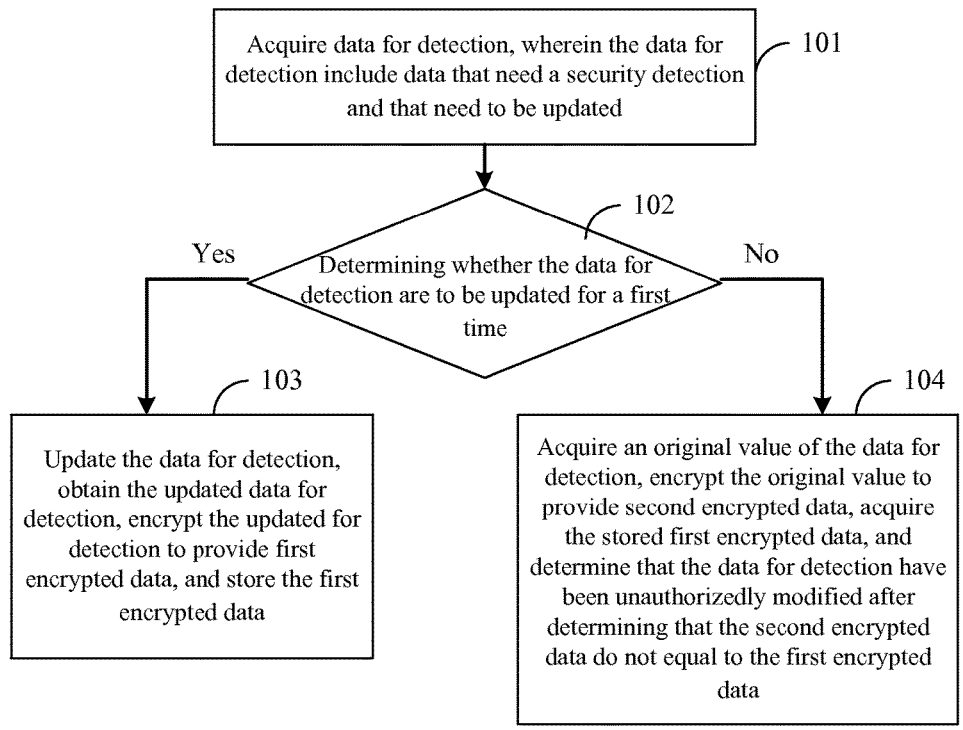
FIG. 1 depicts an exemplary method of detecting data security consistent with various disclosed embodiments.

FIG. 1 depicts an exemplary method of detecting data security consistent with various disclosed embodiments. In Step 101, data for detection are acquired. The data for detection include data that need a security detection and that need to be updated.

For example, all data that need to be updated can be taken as the data for detection. Alternatively, in order to reduce the burden of detection and improve system performance, only key data are detected and updated, while regular data other than the key data can be updated using conventional methods.

For example, Step 101 of acquiring data for detection can include the following. Data that need to be updated is acquired and determined as the data for detection. Or, data that need to be updated is acquired and also determined as the key data, such data can be determined as the data for detection.

Further, what data need for detection that can be configured, according to specific practical applications. The configuration can be configured directly in the client or be issued by a server. For example, before acquiring data for detection, the method of detecting data security further includes: receiving address configuration information of data that need to be monitored from the server. Whether the security detection is needed for the data can be determined according to the address configuration information of the data. The acquiring of data for detection can include acquiring the data for detection after the need of security detection is determined for the data.

In Step 102, it is determined whether the data for detection acquired from Step 101 are to be updated for a first time. When it is the first time to be updated, Step 103 can be executed. When it is not the first time to be updated, Step 104 can be executed.

For example, a record of update history can be searched for the data for detection. When a historical record of update exists, it is determined that the data for detection are not to be updated for the first time. When the historic record of update does not exist, it is determined that the data for detection are to be updated for the first time.

In another example, whether the data for detection has corresponding updated data can be searched. When the corresponding updated data exist, it is determined that the data for detection are not to be updated for the first time. When the corresponding updated data do not exist, it is determined that the data for detection are to be updated for the first time. Of course, other suitable methods of determining whether the data for detection are to be updated for the first time can be used and included without limitation.

In Step 103, when the data for detection are to be updated for the first time, the data for detection can be updated to obtain updated data for detection. The updated data for detection can be encrypted to provide first encrypted data. The first encrypted data can be stored.

For example, an encryption algorithm can be configured according to specific practical applications. The storing method and storing address of the first encrypted data can be configured according to actual needs. For example, the first encrypted data can be stored in a certain address of a memory In Step 104, when it is determined that the data for detection are not to be updated for the first time, an original value of the data for detection can be acquired and encrypted to provide second encrypted data. The stored first encrypted data can be acquired (e.g., the first encrypted data stored when previously updated, e.g., for the first time). It is determined whether the second encrypted data equal to the first encrypted data. When the second encrypted data equal to the first encrypted data, the data for detection that are not to be updated for the first time (or have otherwise been updated previously) can be determined having had an authorized update. When the second encrypted data do not equal to the first encrypted data, the data for detection that are not to be updated for the first time (or have otherwise been updated previously) can be determined having been unauthorizedly modified.

For example, the encryption algorithm can be configured according to specific practical applications and can be consistent with the encryption algorithm depicted in Step 103.

Optionally, when the second encrypted data do not equal to the first encrypted data is determined, the second encrypted data can also be stored. The storing method and storing address of the second encrypted data can be configured according to specific practical applications. For example, the second encrypted data can be stored in a certain address of a memory.

Further, after that the data have been unauthorizedly modified is determined, a message indicating the unauthorizedly modification of the data can be notified to the server. For example, after determining that the data have been unauthorizedly modified, the method of detecting data security may further include: sending a notification message to the server. The notification message indicates that the data have been unauthorizedly modified.

In this manner, data for detection are acquired. Whether the data for detection are to be updated for a first time is determined. When the data for detection are to be updated for the first time, the data for detection can be updated to obtain updated data for detection, which can then be encrypted to provide first encrypted data. The first encrypted data can be stored. When the data for detection are not to be updated for the first time, an original value of the data for detection can be acquired and encrypted to provide second encrypted data. The second encrypted data are compared with the stored first encrypted data. When the second encrypted data do not equal to the first encrypted data, then the data that are not to be updated for the first time can be determined having been unauthorizedly modified.

The disclosed method is simple to be implemented without relying on specific logical of a certain application (e.g. a game). Indeed, the disclosed method can be applied and generalized to any applications. For example, even if the applied application changes its version, there is no need to re-design detecting logic according to the changed version of the application. Development and maintenance costs can be reduced significantly. Further, since most operations and verifications as disclosed do not need to be implemented by the server, occupancy of server resources can be reduced, and system performance and user experience can be improved.

Figure 2A:
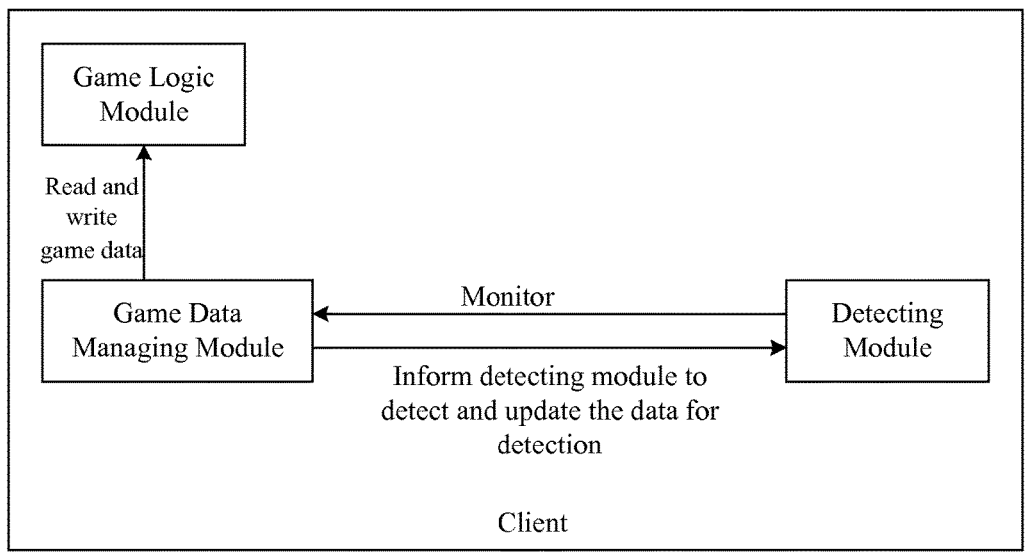
FIG. 2a depicts an exemplary client consistent with various disclosed embodiments.
Figure 2B:
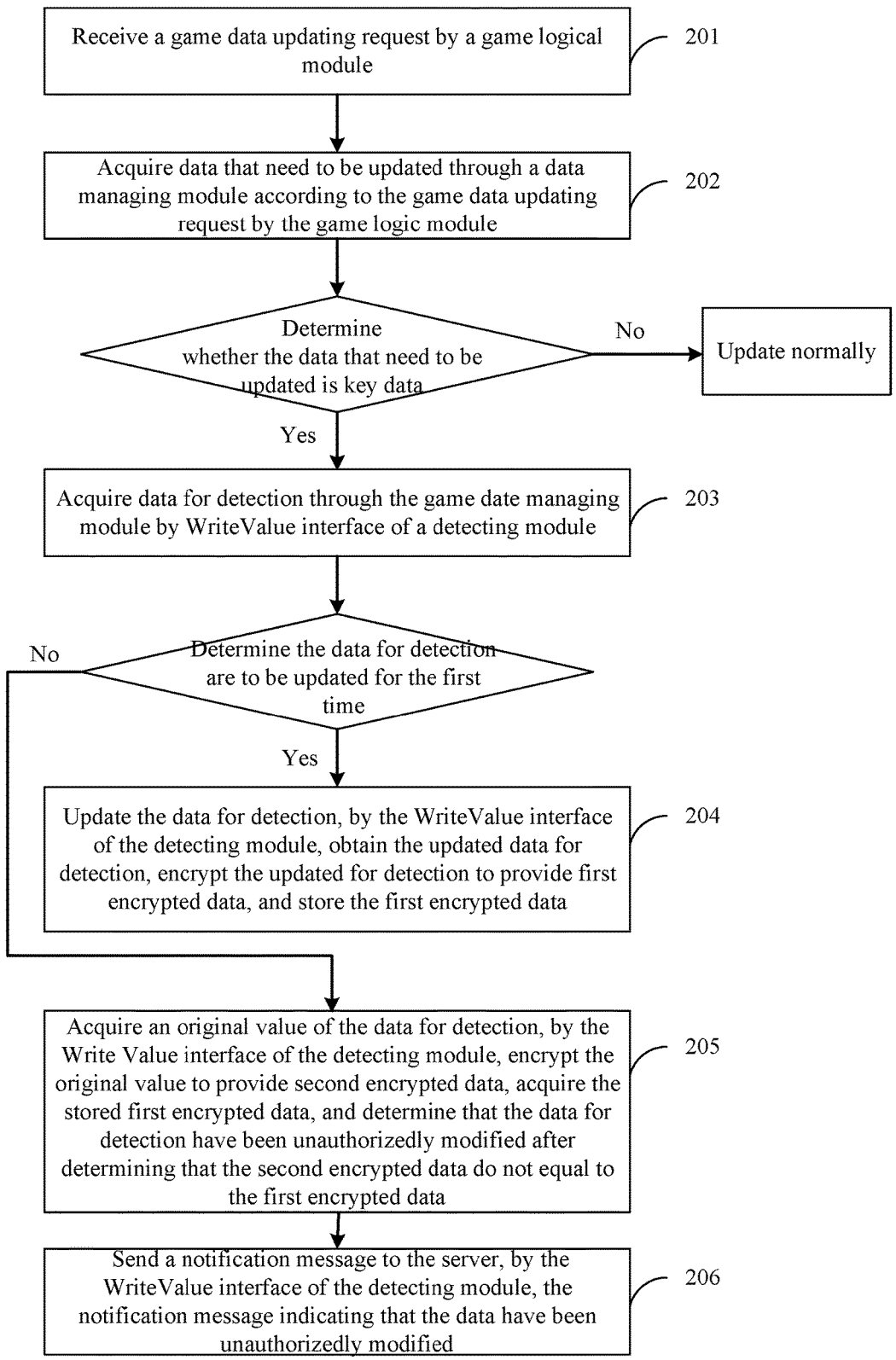
FIG. 2b depicts another exemplary method of detecting data security consistent with various disclosed embodiments.
Figure 3:
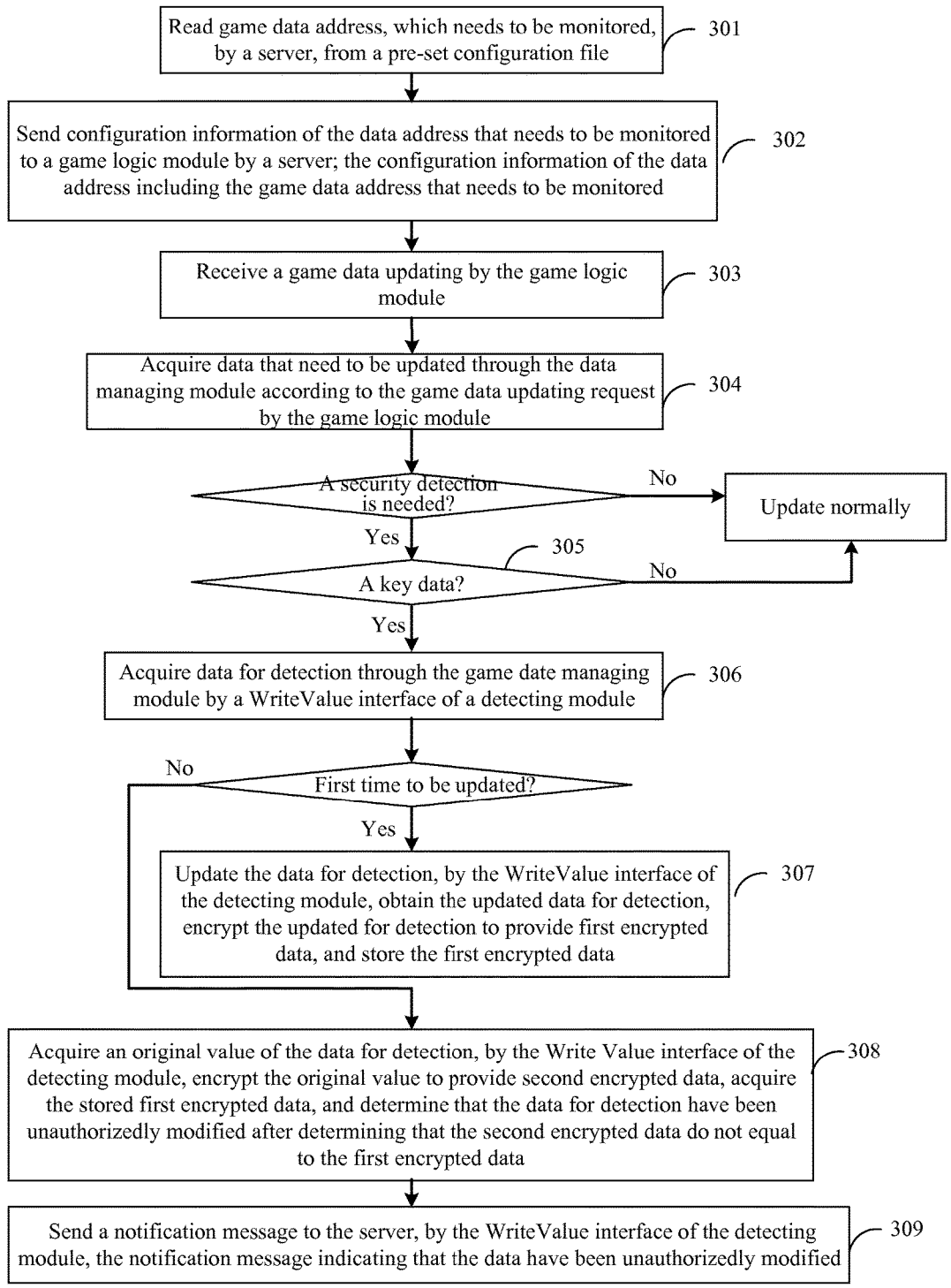
FIG. 3 depicts another exemplary method of detecting data security consistent with various disclosed embodiments.

Exemplary methods of detecting data security can also be provided in FIGS. 2-3. In one embodiment, the disclosed methods can be applied to game data and an apparatus for implementing the disclosed methods can be integrated into a client.

As depicted in FIG. 2a, a client may include a game logic module, a game data managing module, and a detecting module. The detecting module may include a WriteValue interface.

The game logic module is configured to read and write game data through the game Data managing module, to run the game data, and to update game data normally (or regularly) when the detecting module determines that the game data do not need data security detecting. The game data managing module is configured to manage the game data, e.g., to provide the game data to the game logic module or the detecting module.

The detecting module can be an anti-plug-in module. The detecting module may include the WriteValue interface. The WriteValue interface is used to register monitoring SetValue event to the game data managing module, to receive the data for detection sent from the game data managing module through the WriteValue interface when the game data is determined that needs to conduct a security detection, and to conduct the security detection and data update for the data for detection. For example, whether the data for detection are to be updated for a first time can be determined.

When the data for detection are to be updated for the first time, the data for detection can be updated to obtain the updated data for detection. The updated data for detection can then be encrypted to provide first encrypted data. The first encrypted data can be stored. When the data for detection are not to be updated for the first time, an original value of the data for detection can be acquired and encrypted to provide second encrypted data. The stored first encrypted data can be acquired. When the second encrypted data do not equal to the first encrypted data, the data for detection can be determined that have been unauthorizedly modified.

Based on the configuration of the above client, FIG. 2b depicts an exemplary method of detecting data security. In Step 201, the game logical module receives a game data updating request.

In Step 202, the game logic module acquires data that need to be updated through the Data Managing module according to the game data updating request, and determines whether the data that need to be updated is the key data of the game. When it is determined as the key data of the game, the data that need to be updated is determined to be data for detection. The WriteValue interface of detecting module can be called; and Step 203 can be executed. When it is determined the data that need to be updated is not the key data of the game, the data that need to be updated can be updated as usual. For example, any suitable data updating methods can be used and encompassed according to various embodiments.

It should be appreciated that this step can be optional. For example, it is not necessary to determine whether the data that need to be updated are key data, but all data that need to be updated can be used as data for detection.

In Step 203, the WriteValue interface of the detecting module acquires data for detection through the game date managing module, and determines whether the data for detection are to be updated for a first time. When it is the first time to be updated, Step 204 can be executed. When it is not the first time to be updated, Step 205 can be executed.

For example, a record of update history can be searched for the data for detection. When a historical record of update exists, it is determined that the data for detection are not to be updated for the first time. When the historic record of update does not exist, it is determined that the data for detection are to be updated for the first time.

In another example, whether the data for detection has corresponding updated data can be searched. When the corresponding updated data exist, it is determined that the data for detection are not to be updated for the first time. When the corresponding updated data do not exist, it is determined that the data for detection are to be updated for the first time. Of course, other suitable methods of determining whether the data for detection are to be updated for the first time can be used and included without limitation.

In Step 204, when the WriteValue interface of the detecting module determines the data for detection are to be updated for the first time, the data for detection can be updated to obtain the updated data for detection. The updated data for detection can be encrypted to provide first encrypted data.

For example, an encryption algorithm can be configured according to specific practical applications. The storing method and storing address of the first encrypted data can be configured according to actual needs. For example, the first encrypted data can be stored in a certain address of a memory.

In Step 205, when the WriteValue interface of the detecting module determines that the data for detection are not to be updated for the first time, an original value of the data for detection can be acquired and encrypted to provide second encrypted data. The stored first encrypted data can be acquired (e.g., the first encrypted data stored when previously updated, e.g., for the first time). It is determined whether the second encrypted data equal to the first encrypted data. When the second encrypted data equal to the first encrypted data, the data for detection that are not to be updated for the first time (or have otherwise been updated previously) can be determined having had an authorized update. When the second encrypted data do not equal to the first encrypted data, the data for detection that are not to be updated for the first time (or have otherwise been updated previously) can be determined having been unauthorizedly modified.

For example, the encryption algorithm can be configured according to specific practical applications and can be consistent with the encryption algorithm depicted in Step 204. Optionally, when the second encrypted data do not equal to the first encrypted data is determined, the second encrypted data can also be stored. The storing method and storing address of the second encrypted data can be configured according to specific practical applications. For example, the second encrypted data can be stored in a certain address of a memory.

In Step 206, the WriteValue interface of the detecting module sends a notification message to the server. The notification message indicates that the data have been unauthorizedly modified.

In this manner, the detecting module takes over operations for updating game data, e.g., that used to be executed by a game logic module. The detecting module acquires data for detection. Whether the data for detection are to be updated for a first time is determined. When the data for detection are to be updated for the first time, the data for detection can be updated to obtain updated data for detection, which can then be encrypted to provide first encrypted data. The first encrypted data can be stored. When the data for detection are not to be updated for the first time, an original value of the data for detection can be acquired and encrypted to provide second encrypted data. The second encrypted data are compared with the stored first encrypted data. When the second encrypted data do not equal to the first encrypted data, then the data that are not to be updated for the first time can be determined having been unauthorizedly modified. The disclosed method is simple to be implemented without relying on specific logical of a certain application (e.g. a game).

Indeed, the disclosed method can be applied and generalized to any applications. For example, even if the applied application changes its version, there is no need to re-design detecting logic according to the changed version of the application. Development and maintenance costs can be reduced significantly. Further, since most operations and verifications as disclosed do not need to be implemented by the server, occupancy of server resources can be reduced, and system performance and user experience can be improved.

Optionally, what data need for detection that can be configured, according to specific practical applications. The configuration can be configured directly in the client or be issued by a server. The following example is based on issuing configuration by the server.

Similar to the embodiment as depicted in FIG. 2B, for illustration purposes, the exemplary method in FIG. 3 can be described based on the client as depicted in FIG. 2a. FIG. 3 depicts another exemplary method of detecting data security consistent with various disclosed embodiments.

In Step 301, a server reads game data address, which needs to be monitored, from a pre-set configuration file.

In Step 302, the server sends the configuration information of the data address that needs to be monitored to a game logic module. The configuration information of the data address that needs to be monitored includes the game data address that needs to be monitored as read in Step 301.

In Step 303, the game logic module receives a game data updating request (or a request for updating game data).

In Step 304, the game logic module acquires data that need to be updated through the Data Managing module according to the game data updating request, and determines whether the data that need to be updated need data security detection according to the configuration information of the data address received in Step 302. When the data need to conduct data security detection, then Step 305 can be executed. When the data do not need to conduct data security detection, the data that need to be updated can be updated as usual. For example, any suitable data updating methods can be used and encompassed according to various embodiments.

In Step 305, the game logic module determines whether the data that need to be updated is the key data of the game. When it is determined as the key data of the game, the data that need to be updated is determined to be data for detection. The WriteValue interface of detecting module can be called, and Step 306 can be executed. When it is determined the data that need to be updated is not the key data of the game, the data that need to be updated can be updated as usual. For example, any suitable data updating methods can be used and encompassed according to various embodiments.

It should be appreciated that this step can be optional. For example, it is not necessary to determine whether the data that need to be updated are key data, but all data that need to be updated can be used as data for detection.

In Step 306, the WriteValue interface of the detecting module acquires data for detection through the game date managing module. It is determined whether the data for detection are to be updated for a first time. When it is the first time to be updated, Step 307 can be executed. When it is not the first time to be updated, Step 308 can be executed.

For example, a record of update history can be searched for the data for detection. When a historical record of update exists, it is determined that the data for detection are not to be updated for the first time. When the historic record of update does not exist, it is determined that the data for detection are to be updated for the first time.

In another example, whether the data for detection has corresponding updated data can be searched. When the corresponding updated data exist, it is determined that the data for detection are not to be updated for the first time. When the corresponding updated data do not exist, it is determined that the data for detection are to be updated for the first time. Of course, other suitable methods of determining whether the data for detection are to be updated for the first time can be used and included without limitation.

In Step 307, when the WriteValue interface of the detecting module determines the data for detection are to be updated for the first time, the data for detection can be updated to obtain the updated data for detection. The updated data for detection can be encrypted to provide first encrypted data.

For example, an encryption algorithm can be configured according to specific practical applications. The storing method and storing address of the first encrypted data can be configured according to actual needs. For example, the first encrypted data can be stored in a certain address of a memory.

In Step 308, when the WriteValue interface of the detecting module determines the data for detection are not to be updated for the first time, an original value of the data for detection can be acquired and encrypted to provide second encrypted data. The stored first encrypted data can be acquired (e.g., the first encrypted data stored when previously updated, e.g., for the first time). It is determined whether the second encrypted data equal to the first encrypted data. When the second encrypted data equal to the first encrypted data, the data for detection that are not to be updated for the first time (or have otherwise been updated previously) can be determined having had an authorized update. When the second encrypted data do not equal to the first encrypted data, the data for detection that are not to be updated for the first time (or have otherwise been updated previously) can be determined having been unauthorizedly modified, e.g. via the plug-in technique.

For example, the encryption algorithm can be configured according to specific practical applications and can be consistent with the encryption algorithm depicted in Step 307.

Optionally, when the second encrypted data do not equal to the first encrypted data is determined, the second encrypted data can also be stored. The storing method and storing address of the second encrypted data can be configured according to specific practical applications. For example, the second encrypted data can be stored in a certain address of a memory.

In Step 309, the WriteValue interface of the detecting module sends a notification message to the server. The notification message indicates that the data have been unauthorizedly modified.

In this manner, the server is configured to issue the configuration file, and the detecting module takes over operations for updating game data, e.g., that used to be executed by a game logic module. The detecting module acquires data for detection. Whether the data for detection are to be updated for a first time is determined. When the data for detection are to be updated for the first time, the data for detection can be updated to obtain updated data for detection, which can then be encrypted to provide first encrypted data. The first encrypted data can be stored. When the data for detection are not to be updated for the first time, an original value of the data for detection can be acquired and encrypted to provide second encrypted data. The second encrypted data are compared with the stored first encrypted data. When the second encrypted data do not equal to the first encrypted data, then the data that are not to be updated for the first time can be determined having been unauthorizedly modified.

The disclosed method is simple to be implemented without relying on specific logical of a certain application (e.g. a game). Indeed, the disclosed method can be applied and generalized to any applications. For example, even if the applied application changes its version, there is no need to re-design detecting logic according to the changed version of the application. Development and maintenance costs can be reduced significantly. Further, since most operations and verifications as disclosed do not need to be implemented by the server, occupancy of server resources can be reduced, and system performance and user experience can be improved.

Figure 4:
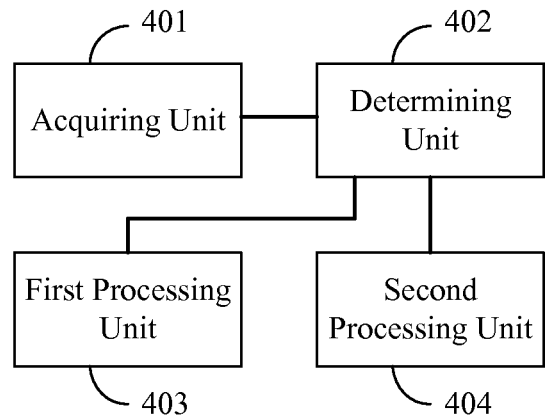
FIG. 4 depicts an exemplary apparatus of detecting data security consistent with various disclosed embodiments.

Various embodiments further provide an exemplary apparatus of detecting data security. As depicted in FIG. 4, an exemplary apparatus of detecting data security includes an acquiring unit 401, a determining unit 402, a first processing unit 403, and a second processing unit 404.

The acquiring unit 401 is configured to acquire data for detection. The data for detection include data that need a security detection and that need to be updated.

For example, all data that need to be updated can be taken as the data for detection. Alternatively, in order to reduce the burden of detection and improve system performance, only key data are detected and updated, while regular data other than the key data can be updated using conventional methods.

The acquiring unit 401 is configured to acquire data that need to be updated, which is determined as the data for detection. Or the acquiring unit 401 can acquire data that need to be updated, and determine that the data that need to be updated is data for detection after the data that need to be updated is determined to be key data.

The determining unit 402 is configured to determine whether the data for detection acquired by the acquiring unit

401 are to be updated for a first time. For example, the determining unit 402 can search a record of update history for the data for detection. When a historical record of update exists, it is determined that the data for detection are not to be updated for the first time. When the historic record of update does not exist, it is determined that the data for detection are to be updated for the first time.

In another example, the determining unit 402 can search for whether the data for detection has corresponding updated data. When the corresponding updated data exist, it is determined that the data for detection are not to be updated for the first time. When the corresponding updated data do not exist, it is determined that the data for detection are to be updated for the first time. Of course, other suitable methods of determining whether the data for detection are to be updated for the first time can be used and included without limitation.

The first processing unit 403 is configured to, when the data for detection are determined to be updated for the first time by the determining unit 402, to update the data for detection, to obtain the updated data for detection, to encrypt the updated data for detection to provide first encrypted data, and to store the first encrypted data.

For example, an encryption algorithm can be configured according to specific practical applications. The storing method and storing address of the first encrypted data can be configured according to actual needs. For example, the first encrypted data can be stored in a certain address of a memory.

The second processing unit 404 is configured to, when the data for detection are determined not be updated for the first time by the determining unit 402, to acquire original value of the data for detection, to encrypt the original value to provide second encrypted data, to acquire the stored first encrypted data, to determine that the data for detection have been unauthorizedly modified when the second encrypted data do not equal to the first encrypted data.

For example, the encryption algorithm can be configured according to specific practical applications and can be consistent with the encryption algorithm depicted in Step 103.

Optionally, when the second encrypted data do not equal to the first encrypted data is determined, the second encrypted data can also be stored. For example, the second processing unit 404 can be configured to store the second encrypted when the second encrypted is determined that do not equal to the first encrypted data.

Further, the storing method and storing address of the second encrypted data can be configured according to specific practical applications. For example, the second encrypted data can be stored in a certain address of a memory.

Further, after that the data have been unauthorizedly modified is determined, a message indicating the unauthorizedly modification of the data can be notified to the server. For example, after determining that the data have been unauthorizedly modified, the second processing unit 404 can be configured to send a notification message to the server. The notification message indicates that the data have been unauthorizedly modified.

Optionally, what data need for detection that can be configured, according to specific practical applications. The configuration can be configured directly in the client or be issued by a server. For example, the apparatus of detecting data security can further include a receiving unit and a Confirming Unit.

The receiving unit is configured to receive the address configuration information of data that need to be monitored from the server.

The determining unit is configured to determine whether the security detection is needed for that data according to the address configuration information of the data received from the receiving unit. The acquiring unit 401 is configured to acquire the data for detection after the need of security detection is determined for the data.

In varied embodiments, the units disclosed herein can be implemented either alone, or in combination according to the disclosed methods. The units disclosed herein be implemented as a same unit or multiple unites. For example, the client shown in FIGS. 2-3 can be used.

The apparatus of detecting data security can be integrated in a client. The client can be installed in a terminal device. The terminal device can include, but is not limited to, smart phones, tablet computers, e-book readers, MP3 players, MP4 players, laptops, and desktop computers.

In this manner, the acquiring unit 401 of the exemplary apparatus of detecting data security acquires data for detection. The determining unit 402 determines whether the data for detection are to be updated for a first time. When the data for detection are to be updated for the first time, the data for detection can be updated to obtain updated data for detection by the first processing unit 403. The updated data for detection can then be encrypted to provide first encrypted data. The first encrypted data can be stored. When the data for detection are not to be updated for the first time, an original value of the data for detection can be acquired and encrypted to provide second encrypted data by the second first processing unit 404. The second encrypted data are compared with the stored first encrypted data. When the second encrypted data do not equal to the first encrypted data, then the data that are not to be updated for the first time can be determined having been unauthorizedly modified.

The disclosed method is simple to be implemented without relying on specific logical of a certain application (e.g. a game). Indeed, the disclosed method can be applied and generalized to any applications. For example, even if the applied application changes its version, there is no need to re-design detecting logic according to the changed version of the application. Development and maintenance costs can be reduced significantly. Further, since most operations and verifications as disclosed do not need to be implemented by the server, occupancy of server resources can be reduced, and system performance and user experience can be improved.

Accordingly, an exemplary communication system can be provided. The exemplary communication system can include any apparatus of detecting data security. Further, the communication system may also include other apparatus, such as a server.

The server may be configured to receive the notification message sent by the apparatus of detecting data security (e.g., the second processing unit 404 of the apparatus of detecting data security). The notification message indicates that the data have been unauthorizedly modified.

Optionally, the server can be configured to read game data address that need to monitored from the pre-set configuration file, and to send the configuration information of the data that need to be monitored to the apparatus of detecting data security (e.g., in particular, the acquiring unit 401 of the apparatus of detecting data security). The configuration information of the data that need to be monitored includes the game data address that need to be monitored, read in Step 301.

Specific implementation of each apparatus can be referred to the above-described embodiments. Since the communication system includes any apparatus of detecting data security provided by various embodiments, the communication system can achieve the same positive effect as the apparatus of detecting dada security provided by various embodiments.

FIG. 5 is a structural diagram of an exemplary terminal device 500 consistent with various disclosed embodiments. The disclosed apparatus can be included in the exemplary terminal device 500.

The exemplary terminal device 500 can include an RF (Radio Frequency) circuit 501, a memory device 502 including one or more computer-readable storage media, an input unit 503, a display unit 504, a sensor 505, an audio circuit 506, a WIFI (Wireless Fidelity) module 507, a processor 508 including one or more processing cores, a power supply 509, and/or other components. In various embodiments, the terminal device(s) described herein can include more or less components as depicted in FIG. 5. Certain parts can be omitted, combined, replaced, and/or added.

The RF circuit 501 may be used to send and receive information or send and receive signal during communication. In particular, after receiving downlink information from a base station, such information can be processed by the one or more processors 508. Further, the data related to the uplink can be sent to the base station. Generally, the RF circuit 501 can include, but be not limited to, an antenna, at least one amplifier, a tuner, one or more oscillators, user identity module (SIM) card, a transceiver, a coupler, LNA (i.e., Low Noise Amplifier), duplexer, etc. In addition, the RF circuit 501 may communicate with other devices via a wireless communication network. The wireless communication may use any communication standards or protocols, including but not limited to, GSM (Global System for Mobile Communications), GPRS (General Packet Radio Service), CDMA (Code Division Multiple Access), WCDMA (Wideband Code Division Multiple Access), LTE (Long Term Evolution), e-mail, SMS (Short Messaging Service), etc.

The memory device 502 can be used for storing software programs and modules, such as those software programs and modules corresponding to the terminal device and the third party service provider as described in FIGS. 3-5 for business processing. By running software programs and modules stored in the memory device 502, the processor 508 can perform various functional applications and data processing to achieve business processing. The memory device 502 can include a program storage area and a data storage area. The program storage area can store the operating system, applications (such as sound playback, image playback, etc.) required by at least one function. The data storage area can store data (such as audio data, phone book, etc.) created when using the terminal device 500. In addition, the memory device 502 may include a high-speed random access memory, a non-volatile memory, such as at least one disk memory, flash memory, and/or other volatile solid-state memory elements. Accordingly, the memory device 502 may further include a memory controller to provide the processor 508 and the input unit 503 with access to the memory device 502.

The input unit 503 can be used to receive inputted numeric or character information, and to generate signal input of keyboard, mouse, joystick, and trackball or optical signal input related to the user settings and function controls. Specifically, the input unit 503 may include a touch sensitive surface and other input device(s). The touch-sensitive surface, also known as a touch screen or touch panel, may collect touch operations that a user conducts on or near the touch-sensitive surface. For example, a user may use a finger, a stylus, and any other suitable object or attachment on the touch-sensitive surface or on an area near the touch-sensitive surface. The touch-sensitive surface may drive a connecting device based on a preset program. Optionally, the touch sensitive surface may include a touch detection device and a touch controller. The touch detection device can detect user's touch position and detect a signal due to a touch operation and send the signal to the touch controller. The touch controller can receive touch information from the touch detection device, convert the touch information into contact coordinates to send to the processor 508, and receive commands sent from the processor 508 to execute. Furthermore, the touch sensitive surface can be realized by resistive, capacitive, infrared surface acoustic wave, and/or other types of surface touch. In addition to the touch sensitive surface, the input unit 503 may also include other input device(s). Specifically, the other input device(s) may include, but be not limited to, a physical keyboard, function keys (such as volume control buttons, switch buttons, etc.), a trackball, a mouse, an operating lever, or combinations thereof.

The display unit 504 can be used to display information inputted by the user, information provided to the user, and a variety of graphical user interfaces of the terminal device 500. These graphical user interfaces can be formed by images, text, icons, videos, and/or any combinations thereof. The display unit 504 may include a display panel configured by, e.g., LCD (Liquid Crystal Display), OLED (Organic Light-Emitting Diode), etc. Further, the touch sensitive surface may cover the display unit 504. When the touch sensitive surface detects a touch operation on or near the touch sensitive surface, the touch operation can be sent to the processor 508 to determine a type of the touch operation. Accordingly, the processor 508 can provide visual output on the display unit 504. Although in FIG. 5 the touch-sensitive surface and the display panel are shown as two separate components to achieve input and output functions, in some embodiments, the touch sensitive surface and the display panel can be integrated to perform input and output functions.

The terminal device 500 may further include at least one sensor 505, such as optical sensors, motion sensors, and other suitable sensors. Specifically, the optical sensors may include an ambient optical sensor and a proximity sensor. The ambient optical sensor may adjust brightness of the display panel according to the brightness of ambient light. The proximity sensor can turn off the display panel and/or turn backlighting, when the terminal device 500 moves to an ear. As a type of motion sensor, a gravity sensor may detect amount of an acceleration in each direction (e.g., including three axis) and detect magnitude and direction of gravity when in stationary. The gravity sensor can be used to identify phone posture (for example, switching between horizontal and vertical screens, related games, magnetometer calibration posture, etc.), vibration recognition related functions (e.g., pedometer, percussion, etc.), etc. The terminal device 500 can also be configured with, e.g., a gyroscope, a barometer, a hygrometer, a thermometer, an infrared sensor, and/or other sensors.

The audio circuit 506, the speaker, and the microphone may provide an audio interface between the user and terminal device 500. The audio circuit 506 may transmit an electrical signal converted from the received audio data to the speaker to convert into audio signal output. On the other hand, the microphone can convert the collected sound signal to an electrical signal, which can be received by the audio circuit 506 to convert into audio data. The audio data can be output to the processor 508 for processing and then use the RF circuit 501 to transmit to, e.g., another terminal device. Alternatively, the audio data can be output to the memory device 502 for further processing. The audio circuit 506 may also include an earplug jack to provide communications between the peripheral headset and the terminal device 500.

WiFi is used as a short-range wireless transmission technology. The terminal device 500 may use the WIFI module 507 to help users send and receive emails, browse websites, access streaming media, etc. The WIFI module 507 can provide users with a wireless or wired broadband Internet access. In various embodiments, the transport module 507 can be configured within or outside of the terminal device 500 as depicted in FIG. 5.

The processor 508 can be a control center of the terminal device 500: using a variety of interfaces and circuits to connect various parts, e.g., throughout a mobile phone; running or executing software programs and/or modules stored in the memory device 502; calling the stored data in the memory device 502; and/or performing various functions and data processing of the terminal device 500 to monitor the overall mobile phone. Optionally, the processor 508 may include one or more processing cores. In an exemplary embodiment, the processor 508 may integrate application processor with modulation and demodulation processor. The application processor is mainly used to process operating system, user interface, and applications. The modulation and demodulation processor is mainly used to deal with wireless communications. In various embodiments, the modulation and demodulation processor may or may not be integrated into the processor 508.

The terminal device 500 may further include a power supply 509 (such as a battery) to power various components of the terminal device. In an exemplary embodiment, the power supply can be connected to the processor 508 via the power management system, and thus use the power management system to manage charging, discharging, and/or power management functions. The power supply 509 may also include one or more DC or AC power supplies, a recharging system, a power failure detection circuit, a power converter or inverter, a power status indicator and/or any other suitable components.

Although not shown in FIG. 5, the terminal device 500 can further include a camera, a Bluetooth module, etc. without limitation. Specifically, the processor 508 of the terminal device can follow the instructions below to load executable files corresponding to one or more application programs into the memory 502. The processor 508 can execute application programs stored in the memory 502 to achieve various functions.

Although not shown in FIG. 5, the terminal device 500 can further include a camera, a Bluetooth module, etc. without limitation. Specifically, the terminal device can have a display unit of a touch screen display, a memory, and one or more programs stored in the memory. The terminal device can be configured to use one or more processor to execute the one or more programs stored in the memory.

In an exemplary method, data for detection are acquired. The data for detection include data that need a security detection and that need to be updated. Whether the data for detection are to be updated for a first time is then determined. When the data for detection are to be updated for the first time is determined, the data for detection can be updated to obtain the updated data for detection, which can then be encrypted to provide first encrypted data. The first encrypted data can be stored. When the data for detection are not to be updated for the first time is determined, an original value of the data for detection can be acquired and encrypted to provide second encrypted data. The stored first encrypted data can be acquired. When the second encrypted data do not equal to the first encrypted data is determined, the data for detection have been unauthorizedly modified can be determined.

Further, all data that need to be updated can be taken as the data for detection. Alternatively, in order to reduce the burden of detection and improve system performance, only key data are detected and updated, while regular data other than the key data can be updated using conventional methods.

What need for detection that can be configured, according to specific practical applications. The configuration can be configured directly in the client or be issued by a server. For example, before acquiring data for detection, the method of detecting data security further includes: receiving address configuration information of data that need to be monitored from the server. Whether the security detection is needed for the data can be determined according to the address configuration information of the data. The acquiring of data for detection can include acquiring the data for detection after the need of security detection is determined for the data.

Optionally, when the second encrypted data do not equal to the first encrypted data is determined, the second encrypted data may also be stored. Further, after that the data have been unauthorizedly modified is determined, a message indicating the unauthorizedly modification of the data can be notified to the server. For example, after determining that the data have been unauthorizedly modified, the method may further includes: sending a notification message to the server. The notification message indicates that the data have been unauthorizedly modified. Specific implementation of each step can be referred to above embodiments.

In this manner, the terminal device acquires data for detection. Whether the data for detection are to be updated for a first time is determined. When the data for detection are to be updated for the first time, the data for detection can be updated to obtain updated data for detection, which can then be encrypted to provide first encrypted data. The first encrypted data can be stored. When the data for detection are not to be updated for the first time, an original value of the data for detection can be acquired and encrypted to provide second encrypted data. The second encrypted data are compared with the stored first encrypted data. When the second encrypted data do not equal to the first encrypted data, then the data that are not to be updated for the first time can be determined having been unauthorizedly modified.

The disclosed method is simple to be implemented without relying on specific logical of a certain application (e.g. a game). Indeed, the disclosed method can be applied and generalized to any applications. For example, even if the applied application changes its version, there is no need to re-design detecting logic according to the changed version of the application. Development and maintenance costs can be reduced significantly. Further, since most operations and verifications as disclosed do not need to be implemented by the server, occupancy of server resources can be reduced, and system performance and user experience can be improved.

It should be noted that, in the present disclosure each embodiment is progressively described, i.e., each embodiment is described and focused on difference between embodiments. Similar and/or the same portions between various embodiments can be referred to with each other. In addition, exemplary apparatus (e.g., a server) is described with respect to corresponding methods.

The disclosed methods, and/or apparatus can be implemented in a suitable computing environment. The disclosure can be described with reference to symbol(s) and step(s) performed by one or more computers, unless otherwise specified. Therefore, steps and/or implementations described herein can be described for one or more times and executed by computer(s). As used herein, the term "executed by computer(s)" includes an execution of a computer processing unit on electronic signals of data in a structured type. Such execution can convert data or maintain the data in a position in a memory system (or storage device) of the computer, which can be reconfigured to alter the execution of the computer as appreciated by those skilled in the art. The data structure maintained by the data includes a physical location in the memory, which has specific properties defined by the data format. However, the embodiments described herein are not limited. The steps and implementations described herein may be performed by hardware.

A person of ordinary skill in the art can understand that the modules included herein are described according to their functional logic, but are not limited to the above descriptions as long as the modules can implement corresponding functions. Further, the specific name of each functional module is used for distinguishing from on another without limiting the protection scope of the present disclosure.

As used herein, the term "module" can be software objects executed on a computing system. A variety of components described herein including elements, modules, units, engines, and services can be executed in the computing system. The apparatus, devices, and/or methods can be implemented in a software manner. Of course, the apparatus, devices, and/or methods can be implemented using hardware. All of which are within the scope of the present disclosure.

In various embodiments, the disclosed modules can be configured in one apparatus (e.g., a processing unit) or configured in multiple apparatus as desired. The modules disclosed herein can be integrated in one module or in multiple modules. Each of the modules disclosed herein can be divided into one or more sub-modules, which can be recombined in any manner.

One of ordinary skill in the art would appreciate that suitable software and/or hardware (e.g., a universal hardware platform) may be included and used in the disclosed methods and systems. For example, the disclosed embodiments can be implemented by hardware only, which alternatively can be implemented by software products only. The software products can be stored in a computer-readable storage medium including, e.g., ROM/RAM, magnetic disk, optical disk, etc. The software products can include suitable commands to enable a terminal device (e.g., including a mobile phone, a personal computer, a server, or a network device, etc.) to implement the disclosed embodiments.

Note that, the term "comprising", "including" or any other variants thereof are intended to cover a non-exclusive inclusion, such that the process, method, article, or apparatus containing a number of elements also include not only those elements, but also other elements that are not expressly listed; or further include inherent elements of the process, method, article or apparatus. Without further restrictions, the statement "includes a . . . " does not exclude other elements included in the process, method, article, or apparatus having those elements.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

In the disclosed methods, apparatus and system of detecting data security, data for detection are acquired. Whether the data for detection are to be updated for a first time is determined. When the data for detection are to be updated for the first time, the data for detection can be updated to obtain updated data for detection, which can then be encrypted to provide first encrypted data. The first encrypted data can be stored. When the data for detection are not to be updated for the first time, an original value of the data for detection can be acquired and encrypted to provide second encrypted data. The second encrypted data are compared with the stored first encrypted data. When the second encrypted data do not equal to the first encrypted data, then the data that are not to be updated for the first time can be determined having been unauthorizedly modified.

The disclosed methods, apparatus and system are simple to be implemented without relying on specific logical of a certain application (e.g. a game). Indeed, the disclosed method can be applied and generalized to any applications. For example, even if the applied application changes its version, there is no need to re-design detecting logic according to the changed version of the application. Development and maintenance costs can be reduced significantly. Further, since most operations and verifications as disclosed do not need to be implemented by the server, occupancy of server resources can be reduced, and system performance and user experience can be improved.

What is claimed is:

1. A method of detecting unauthorized data modification implemented on a game client, the game client is installed on a computing device and executed by one or more processors of the computing device, comprising:
    monitoring, by the game client, data updating events for to-be-updated game data;
    determining, by the game client, whether the to-be-updated game data need security detection;
    updating, by a game logic module of the game client, the to-be-updated game data normally when a detecting module of the game client determines that the to-be-updated game data do not need the security detection;
    when the to-be-updated game data needs the security detection, acquiring, by the game client, data for detection, wherein the data for detection is the to-be-updated game data that needs the security detection;
    determining whether the data for detection are to be updated for a first time by searching for a historical update record corresponding to the data for detection or searching for an updated data corresponding to the data for detection, wherein when the historical update record or the updated data exists, the data for detection are determined not to be updated for the first time; and when the historical update record or the updated data does not exist, the data for detection are determined to be updated for the first time; and when the data for detection are to be updated for the first time,
   updating the data for detection,
   obtaining the updated data for detection,
   encrypting the updated data for detection to provide first encrypted data, and
   storing the first encrypted data; or when the data for detection are not to be updated for the first time,
   acquiring an original value of the data for detection,
   encrypting the original value to provide second encrypted data,
   acquiring the stored first encrypted data, and
   determining that the data for detection have been unauthorizedly modified, after determining that the second encrypted data do not equal to the first encrypted data.

2. The method according to claim 1, wherein the acquiring of data for detection includes:
   acquiring data that need to be updated, and determining that the data that need to be updated are the data for detection; or
   acquiring data that need to be updated, and after determining that the data that need to be updated are key data, determining that the data that need to be updated are the data for detection.

3. The method according to claim 1, further including:
   receiving address configuration information of data that need to be monitored sent from a server; and
   determining whether the security detection is needed for the data, according to the address configuration information of the data;
   wherein the acquiring of data for detection includes: after determining that the security detection is needed for the data, acquiring the data as the data for detection.

4. The method according to claim 1, wherein, after determining that the data for detection have been unauthorizedly modified, the method further includes:
   sending a notification message to the server, wherein the notification message indicates that the data have been unauthorizedly modified.

5. The method according to claim 1, further including:
   storing the second encrypted data, when that the second encrypted data do not equal to the first encrypted data is determined.

6. The method according to claim 1, further comprising:
   reading and writing, by the game logic module, game data through a game data managing module of the game client;
   running, by the game logic module, the game data;
   managing, by the game data managing module, the game data;
   providing, by the game data managing module, the game data to the game logic module and the detecting module; and
   receiving, by the detecting module, the to-be-updated game data from the game data managing module when the to-be-updated game data needs the security detection.

7. An apparatus of detecting unauthorized data modification, a game client is installed on the apparatus, comprising:
   at least a hardware processor and a plurality of program units of the game client to be executed by the processor for detecting unauthorized data modification, the plurality of program units comprising:
   an acquiring unit configured to: monitor data updating events for to-be-updated game data; determine whether the to-be-updated game data need security detection; and when the to-be-updated game data needs the security detection, acquire data for detection, wherein the data for detection is the to-be-updated game data that needs the security detection;
   a determining unit configured to determine whether the data for detection are to be updated for a first time by searching for a historical update record corresponding to the data for detection or searching for an updated data corresponding to the data for detection, wherein when the historical update record or the updated data exists, the determining unit determines that the data for detection are not to be updated for the first time; and when the historical update record or the updated data does not exist, the determining unit determines that the data for detection is to be updated for the first time;
   a first processing unit configured, after determining that the data for detection are to be updated for the first time, to update the data for detection, to obtain the updated data for detection, to encrypt the updated data for detection to provide first encrypted data, and to save the first encrypted data; and
   a second processing unit configured, after determining that the data for detection are not to be updated for the first time, to acquire an original value of the data for detection, to encrypt the original value to provide second encrypted data, to acquire the stored first encrypted data, and to determine that the data for detection have been unauthorizedly modified, after determining that the second encrypted data do not equal to the first encrypted data;
   wherein the game client further includes a game logic module and a detecting module, the game logic module is configured to: update the to-be-updated game data normally when the detecting module determines that the to-be-updated game data do not need the security detection.

8. The apparatus according to claim 7, wherein:
   the acquiring unit is configured to acquire data that need to be updated, and determine that the data that need to be updated are the data for detection.

9. The apparatus according to claim 7, wherein:
   the acquiring unit is configured to acquire data that need to be updated, and, after determining that the data that need to be updated are key data, determine that the data that need to be updated are the data for detection.

10. The apparatus according to claim 7, the plurality of program units further including a receiving unit, wherein
   the receiving unit is configured to receive address configuration information of data that need to be monitored sent from a server;
   the determining unit is configured to determine whether the security detection is needed for the data, according to the address configuration information of the data; and
   the acquiring unit is configured, after determining that the security detection is needed for the data, to acquire the data as the data for detection.

11. The apparatus according to claim 7, wherein:
   the second processing unit is further configured to send a notification message to the server after determining that the data for detection have been unauthorizedly modified, wherein the notification message indicates that the data have been unauthorizedly modified.

12. The apparatus according to claim 7, wherein:
the second processing unit is further configured to store the second encrypted data, when that the second encrypted data do not equal to the first encrypted data is determined.

13. The apparatus according to claim 7, wherein: the game client further includes a game data managing module, wherein:
the game logic module is configured to:
read and write game data through the game data managing module; and
run the game data;
the game data managing module is configured to manage the game data, and provide the game data to the game logic module and the detecting module; and
the detecting module is configured to:
monitor the data updating events of the game data managing module for the to-be-updated game data;
determine whether the to-be-updated game data need the security detection;
receive the to-be-updated game data from the game data managing module when the to-be-updated game data needs the security detection.

14. A non-transitory computer-readable medium having computer program of a game client for, when being executed by a processor, performing a method of detecting unauthorized data modification, the method comprising:
monitoring, by the game client, data updating events for to-be-updated game data;
determining, by the game client, whether the to-be-updated game data need security detection;
updating, by a game logic module of the game client, the to-be-updated game data normally when a detecting module of the game client determines that the to-be-updated game data do not need the security detection;
when the to-be-updated game data needs the security detection, acquiring data for detection, wherein the data for detection is the to-be-updated game data that needs the security detection;
determining whether the data for detection are to be updated for a first time by searching for a historical update record corresponding to the data for detection or searching for an updated data corresponding to the data for detection, wherein when the historical update record or the updated data exists, the data for detection are determined not to be updated for the first time; and when the historical update record or the updated data does not exist, the data for detection are determined to be updated for the first time; and when the data for detection are to be updated for the first time,
updating the data for detection,
obtaining the updated data for detection,
encrypting the updated data for detection to provide first encrypted data, and
storing the first encrypted data; or
when the data for detection are not to be updated for the first time,
acquiring an original value of the data for detection,
encrypting the original value to provide second encrypted data,
acquiring the stored first encrypted data, and
determining that the data for detection have been unauthorizedly modified, after determining that the second encrypted data do not equal to the first encrypted data.

15. The non-transitory computer-readable medium according to claim 14, wherein the acquiring of data for detection includes:
acquiring data that need to be updated, and determining that the data that need to be updated are the data for detection; or
acquiring data that need to be updated, and after determining that the data that need to be updated are key data, determining that the data that need to be updated are the data for detection.

16. The non-transitory computer-readable medium according to claim 14, the method further including:
receiving address configuration information of data that need to be monitored sent from a server; and
determining whether the security detection is needed for the data, according to the address configuration information of the data;
wherein the acquiring of data for detection includes: after determining that the security detection is needed for the data, acquiring the data as the data for detection.

17. The non-transitory computer-readable medium according to claim 14, wherein, after determining that the data for detection have been unauthorizedly modified, the method further includes:
sending a notification message to the server, wherein the notification message indicates that the data have been unauthorizedly modified.

18. The non-transitory computer-readable medium according to claim 14, the method further including:
storing the second encrypted data, when that the second encrypted data do not equal to the first encrypted data is determined.

* * * * *